United States Patent [19]
Nelson et al.

[11] Patent Number: 5,803,022
[45] Date of Patent: Sep. 8, 1998

[54] COMBUSTION AND STEAM ENGINE SYSTEM AND METHODS

[76] Inventors: Daniel Emmet Nelson; Anju Nelson, both of 605 S. Northlake Blvd., No. 91, Altamonte Springs, Fla. 32701

[21] Appl. No.: 553,859

[22] Filed: Nov. 6, 1995

Related U.S. Application Data

[63] Continuation-in-part of Ser. No. 297,406, Aug. 29, 1994, abandoned.

[51] Int. Cl.$^6$ .................................................. F02B 47/02
[52] U.S. Cl. ...................... 123/25 D; 123/25 P; 60/39.05
[58] Field of Search ............................... 123/25 P, 25 D; 60/39.05, 39.53, 39.54, 39.3; 239/132.1, 136

[56] References Cited

U.S. PATENT DOCUMENTS

| | | | |
|---|---|---|---|
| 4,122,803 | 10/1978 | Miller | 123/25 P |
| 4,391,229 | 7/1983 | Turner | 123/25 P |
| 4,402,182 | 9/1983 | Miller | 123/25 P |
| 4,476,817 | 10/1984 | Lindberg | 123/25 P |
| 4,552,106 | 11/1985 | Spence | 123/25 P |
| 4,637,352 | 1/1987 | Green | 123/25 P |
| 4,667,643 | 5/1987 | Arnold | 123/25 P |
| 4,706,462 | 11/1987 | Soltermack | 123/25 P |
| 4,986,223 | 1/1991 | Mahoney | 123/25 P |

FOREIGN PATENT DOCUMENTS

| | | | |
|---|---|---|---|
| 26 12 378 | 10/1977 | Germany | 123/25 P |

*Primary Examiner*—Erick R. Solis

[57] ABSTRACT

A combustion-and-steam engine system has a phase-change water injector (1) through which water is spray-injected into combustion gases in a combustion chamber (2) of a Nelson Engine (79) or any type of heat engine with either rotational or thrust power. A steam tube 45 in fluid communication between an injector orifice (25) and an internal periphery of the combustion chamber can be heated with resistance heat from an engine-electrical source (46) to provide phase-change of water en route to the combustion chamber in the steam tube. An injection-metering valve (22, 25, 26, 43) has a return spring (31) with pressure regulatable by an adjustment means (32, 33, 36, 37, 38, 40) to select flow rate past the injection-metering valve to a return tube (57, 74) without requiring lubricity of water or other fluid under high pressure. A phase-change fuel injector (65) has similar components with a heat tube (13) that can be shorter and bigger around to allow rapid entry of fuel-rich combustion gases into the combustion chamber ahead of steam from the phase-change water injector. Design levels of completeness of combustion of fuel are provided prior to injection of a design heat and consistency of wet steam and dissociated water. This provides a combination of designedly fuel and hydrogen combustion in combination with steam pressures from cooling a heat engine with phase-change heat absorption of water particles in the combustion chamber.

12 Claims, 4 Drawing Sheets

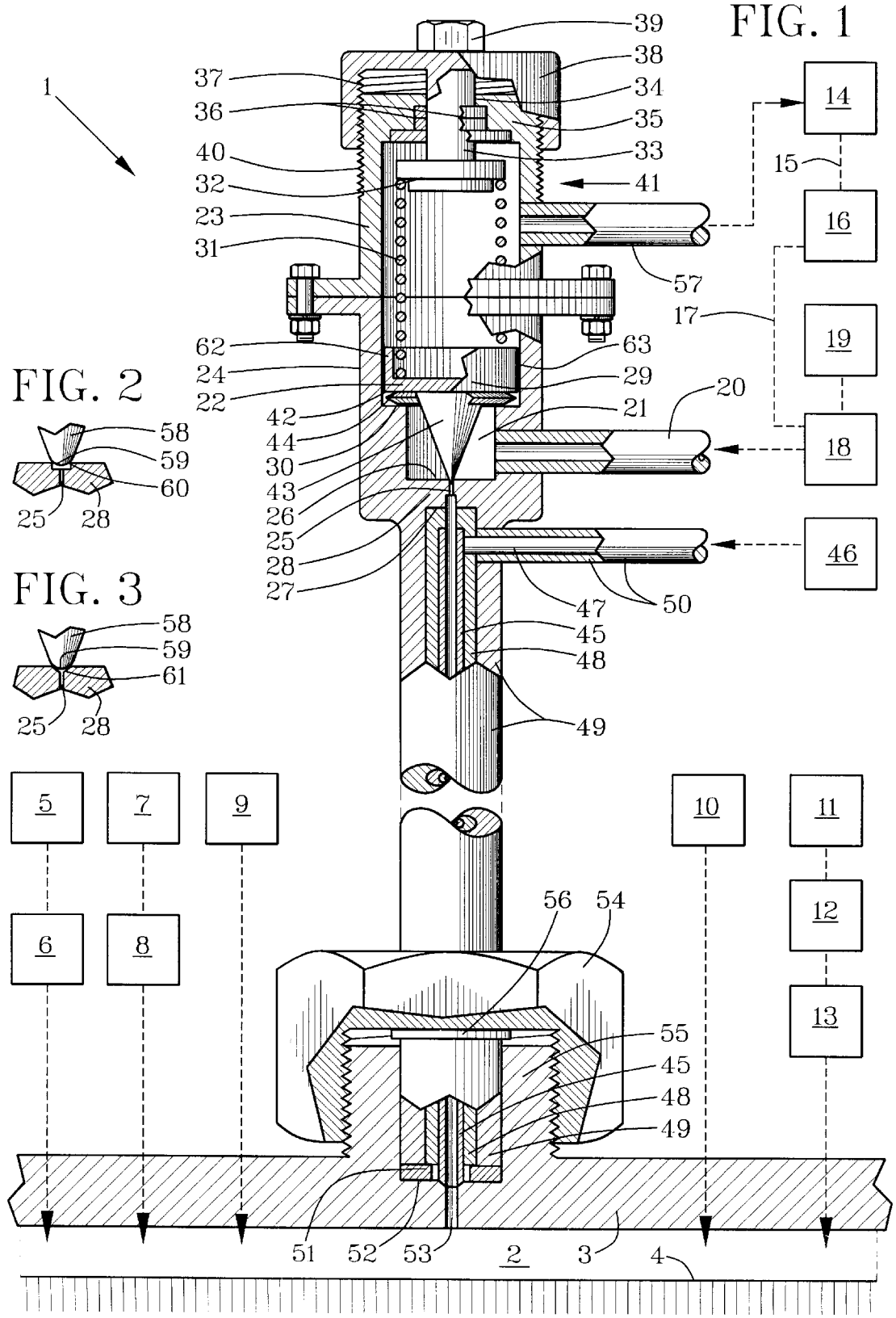

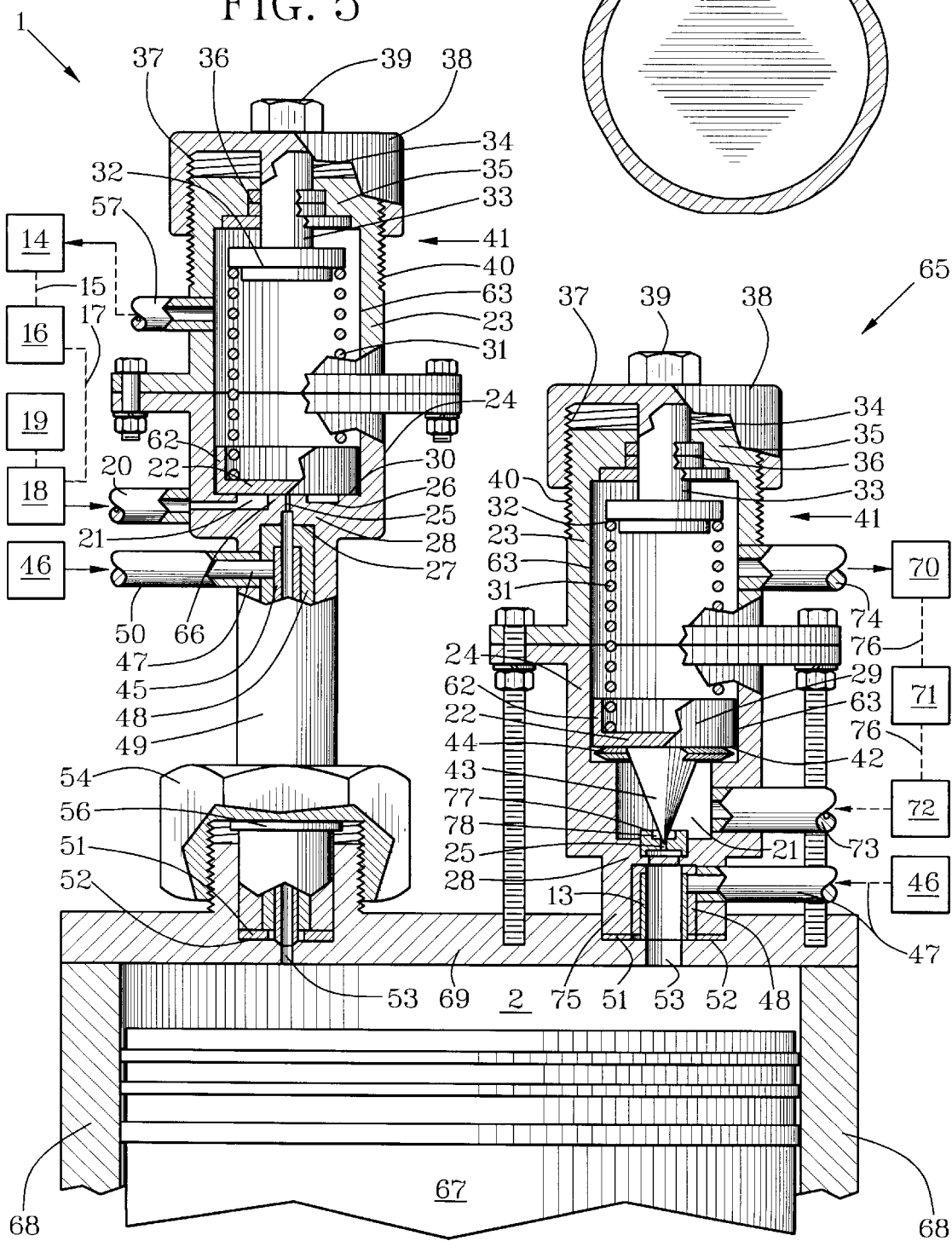

5,803,022

COMBUSTION AND STEAM ENGINE SYSTEM AND METHODS

This is a continuation-in-part of application Ser. No. 08/297,406 filed Aug. 29, 1994, now abandoned.

BACKGROUND OF THE INVENTION

1. Field of the Invention

This invention relates to phase-change injection of fuel and water into combustion chambers of heat engines and in particular to combustion of fuel, combustion of hydrogen dissociated from water and generation of high-pressure steam simultaneously in the same combustion enclosure to provide high pressure for rotational or thrust power in a manner that increases instead of decreases output power from cooling all types of heat engines.

2. Description of Related Art

Previous engine technology has required various forms of waste-heat cooling to prevent heat-distortion in all types of heat engines for rotational power and for thrust power. To overcome heat-loss problems of heat engines, water has been employed variously in relation to combustion.

Examples of different technology in which water and/or steam or other gas were added to an internal-combustion engine are described in the following patent documents. U.S. Pat. No. 5,131,229, issued to Kriegler et al on Jul. 21, 1992, taught a means for adding water to recycled exhaust. U.S. Pat. No. 5,099,802, issued to Förster on Mar. 31, 1992, taught mixing fuel vapor and steam with pre-compressed combustion air before a crankshaft piston achieves full compression. U.S. Pat. No. 4,552,106, issued to Spence on Nov. 12, 1985, taught putting halogen gases into a carburetor for their transfer into a cylinder of an internal-combustion engine. U.S. Pat. No. 4,359,971, issued to Rogers on Nov. 23, 1982, taught another pre-compression, steam-injected carburetor system. U.S. Pat. No. 4,322,950, issued to Jepsen on Apr. 6, 1982, limited itself to heat-sensitive alternation between water injection and fuel injection into cylinders of an internal-combustion engine. U.S. Pat. No. 5,012,772, issued to Nakamura on May 7, 1991, taught two devices that inject heated water instead of injecting phase-changed wet steam at a compression end of piston strokes.

A first Nakamura device, illustrated in FIG. 1 of the Nakamura patent, had a water injector which injected antechamber-heated water into a fuel-injection antechamber. There the water had a counterproductive effect of dousing flame that was inherently cool and vulnerable from fuel-rich mixture ratio. Prior to entry of the water into the fuel-injection antechamber, only a minimal portion if any of it was phase-changed to wet steam. Injecting hot water into combustion gases, not wet steam, was taught. To the extent that phase-change was possible, it occurred near totally in the fuel-injection antechamber and later in the combustion envelope without a thorough phase-change to wet steam in the water injector prior to entry into a combustion chamber.

A second Nakamura device, illustrated in FIG. 2 of the Nakamura patent, had a water injector which injected exhaust-heated water directly into a combustion envelope of a diesel-cycle engine. In the combustion envelope, combustion gases were waste-heat cooled by system-inherent cooling necessary for preventing heat-distortion of engine materials. After heat losses to waste-heat cooling with a water jacket and with air-rich mixture ratio in addition to heat losses to a high exhaust heat to compensate for waste-heat cooling and to provide exhaust heat for water being injected, combustion flame from remaining heat-of-combustion was doused readily by heat absorption to phase-change water and minimal wet steam discharged from the water injector into dry steam. Only a small portion of total fuel heat was available for generation of high-pressure steam. As with the first Nakamura device, only a minimal portion if any water was phase-changed to wet steam prior to entry into a combustion chamber.

U.S. Pat. No. 4,476,817, issued to Lindberg on Oct. 16, 1984, taught unpressured addition of resistance-heated water, steam or hydrogen treated ultrasonically into an engine or combustion chamber prior to combustion-supportive compression at a position proximate a carburetor or pre-compression mixing means. It is physically impossible for unpressured water or steam that is resistance-heated and treated ultrasonically as taught by the Lindberg patent to enter a pressurized combustion enclosure. Unpressured, resistance-heated and ultrasonically treated water taught by Lindberg is limited inherently and ontologically, therefore, to pre-compression or carburetor-position addition to a combustion enclosure. Further, addition of resistance-heated, ultrasonically treated and unpressured water or steam after compression if it were possible would create opposite-directional heat-expansion pressure that would decrease power output from compression heat of compression pressure sufficient to support combustion. Further yet, if there were sufficient electrical field in an ultrasonic-water-addition means and sufficient electrical conductivity of particles in the water for dissociation of hydrogen and oxygen, there would be prematurely counter-pressure combustion of hydrogen in an engine system. For these reasons, the unpressured, resistance-heated and ultrasonically treated device taught by Lindberg is not feasible for post-compression use in a heat engine.

Structure, physical principles and working relationship of parts of these or any combination of any of these patents or of other known devices are so different from the combustion-and-steam engine system and methods taught by this invention that combining them without inventive modifications is not possible. Modifications to employ physical principles of each or modifications to employ physical principles from other sources in ways necessarily different from either are unforeseeable without invention that is the substance of patentability and of patents throughout the world.

No prior art has provided: (A) Designedly complete phase-change of water in a steam tube to wet steam with electrical heat of the steam tube when the water is under pressure sufficient to enter a combustion enclosure in which designedly combustion-supportive pressure exists and the water is en route to the combustion enclosure from an injection orifice in the steam tube; (B) Fine-atomization spray of the water into the steam tube fluidly upstream from addition of electrical phase-change heat; (C) Entry of the wet steam directly into combustion gases in a combustion enclosure; (D) Design electrolytic dissociation of hydrogen and oxygen in water having design conductivity of particles in the steam tube; (E) Output utilization of expansion pressure from design combustion of fuel and design combustion of hydrogen at design heat levels in the combustion enclosure; and (F) Simultaneous use of high-pressure steam from design maximum levels down to designedly near low steam-condensation levels prior to exhaust as taught by this invention. Instead, prior art has relied variously on adding heat to water from exhaust of an engine without either (a) atomization prior to addition of heat; (b) complete phase-change to wet steam with either exhaust gases or electrical heat; (c) electrolytic dissociation of hydrogen and oxygen in a steam tube; nor (d) use of dissociated hydrogen and oxygen to generate combustion pressure in a combustion enclosure. However, there is not enough exhaust-heat waste remaining for phase-change of water after the efficiency of use of fuel heat in the combustion-and-steam thermodynamic cycle taught by this invention.

State-of-the-art thrust engines employ variations of waste-heat cooling. Gas-turbine engines use airflow-overrun cooling. Overrun-cooling air is compressed to combustion-supportive pressure along with air used in combustion. Combustion heat in a front portion of a combustor is cooled with compressed air entering an aft portion of the combustor before combustion gases mixed with cooling air reach turbine blades. This is an example of engine-cooling practices that decrease instead of increase thrust and thermal efficiency as made possible by this invention.

Liquid-fuel rocket engines have a combination of regenerative cooling and engine-ablative cooling. Regenerative cooling is not waste-heat cooling. Instead, heat of fuel obtained from cooling is used to save fuel heat required to achieve effective combustion heat. However, liquid-fuel rocket engines, such as those used currently for space-shuttle craft, only last 33 hours in comparison to 20,000 hours for conventional turbine engines and 40,000 hours for Nelson Rocketjet Engines such as described in U.S. Pat. No. 5,222, 361 which was issued to Nelson et al on Jun. 29, 1993.

Conventional liquid-fuel rocket engines burn up to a degree that they can not maintain structural integrity after only their comparatively minuscule use life. In relation to overall efficiency, this engine burn-up is a form of heat-ablative cooling that in totality of economic and thermal conditions consumes enormous energy for all factors of production, including immense amounts of foundry heat and human-support heat. These expenditures of heat are as much a part of total efficiency as though expended directly on fuel in a closed thermodynamic system. Heat-ablative cooling of liquid-fuel rocket engines and solid-fuel rocket engines, both in functionally different ways are, therefore, thousands of times the most inefficient forms of waste-heat cooling of any heat engines. Liquid-fuel rocket engines, the most efficient of the two conventional types of rocket engines, are not highly efficient as generally regarded when inefficiency of heat-ablative burning of metal for waste-heat cooling is taken into account. Consequently, rocket engines are the most expensive by tens-of-thousands of times per power output of any conventional heat engine. Rocket engines using the Nelson Thermodynamic Cycle, however, are approximately ten-thousand times more efficient on a total-system basis. For air-breathing-jet propulsion using this invention, total-system efficiency is a magnitude of approximately ten times that of conventional jet engines, due partly to high supersonic speeds above sonic-boom altitudes for air-breathing thrust with the Nelson Thermodynamic Cycle in its preferred engine forms of the Nelson Rocketjet Engine.

Waste-heat cooling of internal-combustion engines consumes approximately one-third of fuel heat and pressure generated with conventional thermodynamic cycles. Exhaust-heat waste necessitated by thermodynamic cycles that require waste-heat cooling consumes an additional one-third of fuel heat. Thus, a total of two-thirds of fuel is wasted as a result of waste-heat cooling of internal-combustion engines. After friction losses, net thermal efficiency for turning shafts, therefore, is only 15-to-30 percent for vehicle types of engines. For steam-turbine power-plant engines with a heat-regenerative cycle, thermal efficiency is typically 44 percent.

Thermal efficiency of gas-turbine engines is 30-to-35 percent; Not much better than internal-combustion engines.

After cooling combustion gases to approximately one-third of peak-combustion heat and pressure, only one-third as much pressure from heat remains for powering turbines and providing thrust. With only one-third as much heat available for generating pressure as in liquid-rocket engines, exhaust velocity of present turbine engines is proportionately one-third as high, accounting also for comparably severe performance limitations.

Addition of water in both thrust and shaft types of engines has been tried previously without significant success. Water has been added in turbine engines, not in a manner that can increase exhaust pressure and velocity per fuel consumption as taught by this invention, but in a manner that increases mass-flow for takeoff of aircraft at great sacrifice of exhaust velocity and with untenable weight for in-flight use. Since early days of internal-combustion engines, some Otto-Cycle and some Diesel-Cycle engines have been provided with premix of water in either mist, vapor or droplet forms with intake air prior to compression strokes. Except for an incidentally advantageous side effect of preventing carbon formations, however, the results have been mostly decrease of power from back pressure of premature steam generation and from dousing of flame with water in liquid or sprayed form.

A higher pressure per weight of water as steam than the pressure per weight of fuel and oxidizer as combustion gases has not been employed previously for engine-cooling that increases instead of decreases output pressure of all types of heat engines per fuel consumption. Technology for its accomplishment is taught by this invention.

Another problem with waste-heat cooling of heat engines is generation of smog from heat conditions it causes in the different forms of known engine systems. Polluting exhaust results from under-heat of combustion gases at inside peripheries of combustion chambers and overheat of combustion gases at central portions of combustion chambers. Under-heat causes incomplete combustion of fuel and air or other oxidizer that results in visible smoke-like gases. The overheat of combustion gases under pressure for a duration of time necessary to overcome dead-center conditions in most heat engines and in all conventional internal-combustion engines causes formation of a wide variety of invisible nitrous oxides that are variously stable and variously toxic.

With this invention, these under-heat and overheat conditions are both eliminated. In all forms of heat engines using this invention, steam unites with combustion gases to form non-polluting exhaust. The exhaust from internal-combustion engines using this invention can be condensed as nitrogen-rich water. The nitrogen in the condensed water is in a form that fertilizes plants. It can be collected in a container for use as a fertilizer where desired or allowed to escape as droplets of liquid fertilizer wherever an engine is used. Heat-engine exhaust from jet and rocket thrust as well as from rotational engines can be made to have an animal-fertilizer effect on the environment. Engines can be made thereby to be life-supportive and environmentally-positive instead of environmentally destructive. Used widely, this invention could help to restore atmospheric conditions that existed aeons ago and supported more abundant life than at present.

SUMMARY OF THE INVENTION

In light of numerous problems with heat engines and a potential for overcoming their problems with water employed as steam in combination with combustion of fuel and hydrogen from electrolytic dissociation of water, basic objectives of this invention are to:

1. Provide engine cooling with water that is phase-changed to wet steam while being injected into a combustion enclosure to increase instead of decrease output power from cooling any rotational or thrust type of heat engine;
2. Provide complete combustion of fuel and oxidizer simultaneously with complete conversion of low-pressure wet steam injected to high-pressure dry steam in a combustion enclosure by atomization and addition of combustion-supportive heat to the wet steam prior to injection of the wet steam into the combustion enclosure;
3. Provide cooling of engine materials with phase-change of low-pressure wet steam entering a combustion enclosure to high-pressure dry steam that does not douse combustion flame nor deter completeness of combustion of fuel in the combustion enclosure;
4. Provide more output power from combustion and steam combined than would be available from use of all fuel heat only with conventional thermodynamic cycles in heat engines;
5. Dissociate design portions of hydrogen and oxygen in wet steam with electrolysis using electrical current employed to heat a steam tube in which atomized water is phase-changed into wet steam before entry into a combustion enclosure;
6. Utilize dissociated hydrogen and oxygen to generate combustion pressure, to aid in combustion of fuel and to provide output pressure from expansion as dry gases without deterring combustion of fuel;
7. Provide rotational and thrust engines with combustion-and-steam thermodynamic systems and methods for achieving more power per engine weight and per fuel consumption than from other forms of heat engines and fuel systems; and
8. Provide non-polluting and eco-positive exhaust from all types of heat engines.

These and other objectives are achieved with a phase-change fuel injector and a separate phase-change water injector. Each has a phase-change tube that can be electrical-resistance heated during conveyance of fluid from an injector valve to a combustion chamber for different types of heat engines. Length of the phase-change tube is designed to provide desired conveyance time and desired heat-exchange for phase-change of fluid en route from the injector valve to a combustion chamber. Length of the phase-change tube is greater and its diameter is smaller for generation of steam than for generation of combustion gases. Rate of injection of water to injection of fuel can be controlled thermostatically. Prior to phase-change heat transfer in the phase-change tube, fluid to be injected can be preheated by engine-heat transfer to a heat level supportive of complete phase-change to wet steam.

The injector valve has a disk with a central portion positional in cyclic valve-closure relationship to an injector orifice and a radially outward portion positional on a valve-seat ring. Spring pressure against a return side of the disk forces the disk into simultaneous contact with the valve-seat ring and closure relationship to the injector orifice. Intermediate the central portion and the outward portion of the disk is a fluid-contact portion of the disk. Pressure from injection of fluid, either water or fuel, disengages the central portion and radially outward portions of the disk simultaneously in opposition to a valve spring to allow simultaneous injection of fluid through the injector orifice and return flow of excess fluid past the valve-seat ring and through an injector body to a return conveyance.

There is no sliding contact of valve means to necessitate lubricity of fluid injected. The spring pressure can be adjustable to regulate rate of return flow of excess fluid not injected through the injector orifice.

Heat engines using this invention are changed from being water-cooled, air-cooled or otherwise waste-heat cooled. Instead, thermodynamic losses to: (a) waste-heat cooling, (b) exhaust, (c) excess fuel for initial cooling in Otto-Cycle combustion, (d) work load of compressing excess air for Diesel-Cycle ignition heat, (e) work load for compressing overrun air for cooling turbine engines, and (f) total-system losses for short-life ablative cooling and system support of liquid and solid rockets are saved and utilized to generate steam power in combination with combustion power in inventively appropriate modifications of all types of present heat engines. Adaptation to turbine and rocket engines is provided. The phase-change steam injector can be used separately with present engine-ignition systems or in combination with the combustion generator to form a combustion-and-steam engine system with a combustion-and-steam thermodynamic cycle, referred to also as the Nelson Thermodynamic Cycle, for all types of heat engines.

BRIEF DESCRIPTION OF THE DRAWINGS

This invention is described by appended claims in relation to description of a preferred embodiment with reference to the following drawings which are described briefly as follows:

FIG. 1 is a cutaway elevation view of a phase-change water injector shown in relation to a combustion chamber of a heat engine and in relation to schematic representation of other selective components of the combustion-and-steam engine system for heat engines.

FIG. 2 is a sectional cutaway side view of a rounded point of a conical extension of an orifice cover on a valve disk in sealing relationship to an injector orifice having a circular wall parallel to an axis of the injector orifice for right-angle-edge contact with the rounded point.

FIG. 3 is a sectional cutaway side view of a rounded point of a conical extension of an orifice cover on a valve disk in sealing relationship to an injector orifice having a circular wall at a select angle to an axis of the injector orifice for flat-surface contact with the rounded point.

FIG. 4 is a top view of a valve disk having valve guides and flats as fluid-return conveyances on a circumferential perimeter of the valve disk.

FIG. 5 is a cutaway elevation view of a phase-change water injector and a phase-change fuel injector in relation to a combustion chamber of a heat engine and in relation to schematic representation of other selective components of the combustion-and-steam engine system for heat engines.

DESCRIPTION OF PREFERRED EMBODIMENT

Reference is made first to FIG. 1. A combustion-and-steam engine system is comprised of a phase-change water injector 1 and a combustion chamber 2 in a desired type of heat engine having a desired selection and combination of sources of fuel, air, on-board oxidizer and heat for achieving combustion. The combustion chamber 2 is a combustion enclosure or partial enclosure that has at least a first wall 3 and a second wall 4 from a cross-sectional view.

Figure 6:
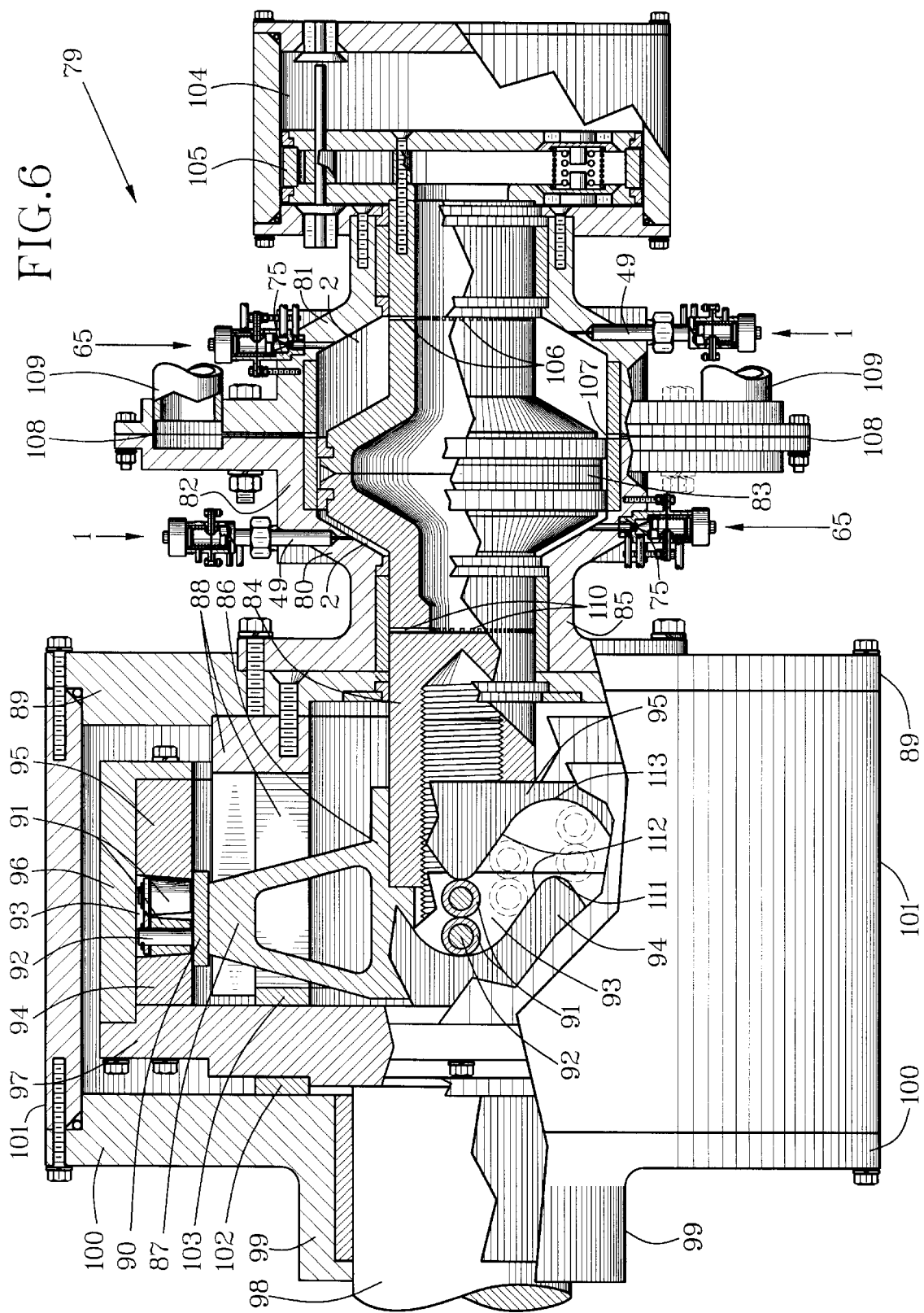
FIG. 6 is a cutaway side view of two phase-change water injectors and two phase-change fuel injectors oppositely disposed in working relationship to a double-acting cylinder with a double-acting piston and a Nelson Drive in a single-piston unit of a Nelson Engine in a preferred embodiment of this invention.
Figure 7:
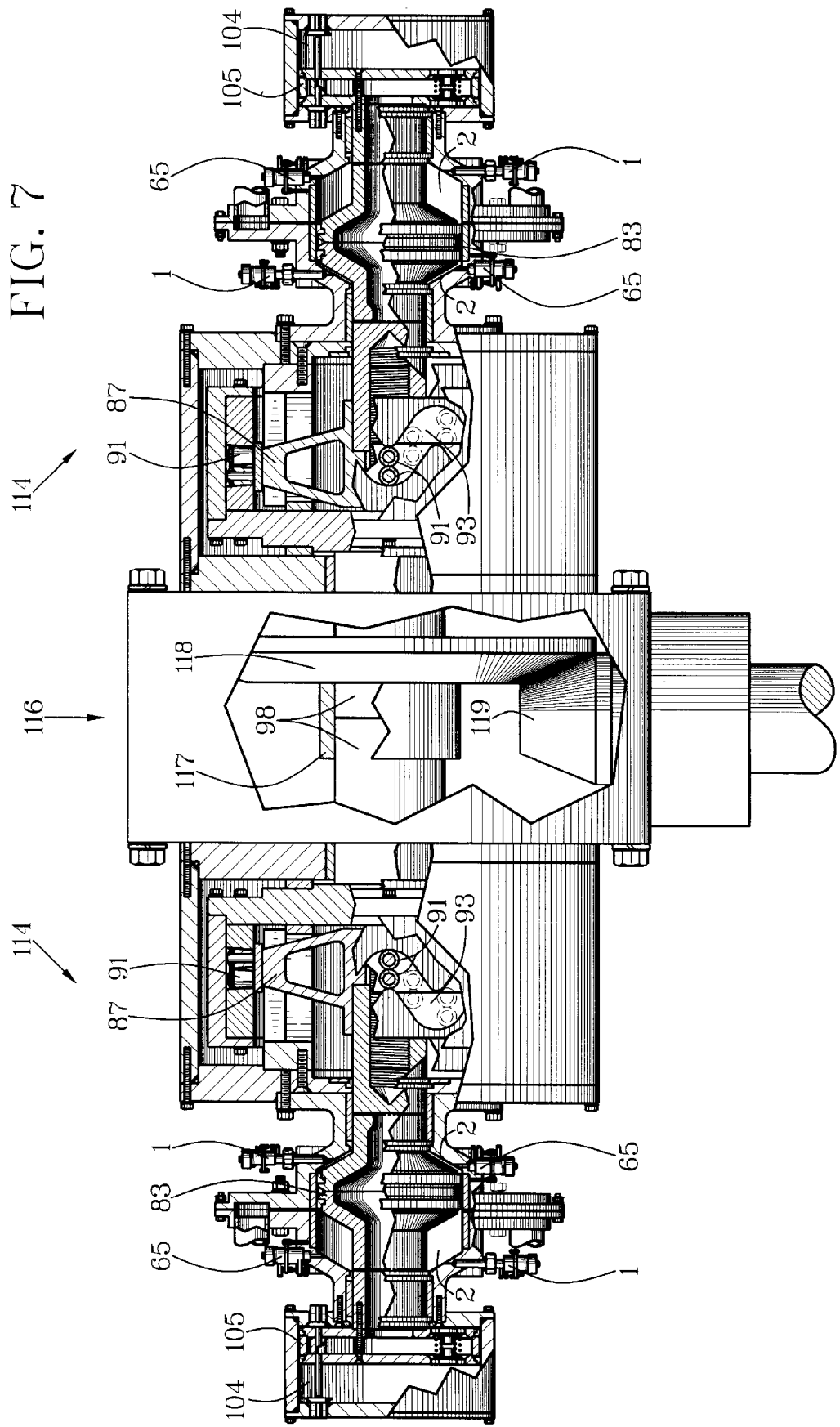
FIG. 7 is a cutaway side view of a Nelson Engine with vibration-damping opposed pistons in working relationship to phase-change water injectors and phase-change fuel injectors.

The combustion chamber 2 with two walls 3 and 4 is representative of all types of combustion chambers. The simplest is an annular or cannular combustion chamber in a turbine engine with a compressor at one end or side and a form of venturi nozzle at an opposite end or side, indicated by left and right sides of the drawing to represent linear flow of gases through a combustion-chamber system. A conventional liquid-rocket engine would have three walls in a cross-sectional view. Internal-combustion engines would have either four walls in a cross-sectional view with one wall for a volume-change element such as a crankshaft piston or Wankel triangular piston, two cross-sectional walls for sides of any form of cylinder and a fourth wall for a head of any form of a cylinder or other combustion envelope. Only the two walls 3 and 4 are utilized for illustrating working relationship of parts of this combustion-and-steam engine system to all heat engines. Greater detail of a combustion chamber 2 in a piston engine is shown in FIG. 5. Working relationship to a combustion chamber 2 of a preferred heat engine, the Nelson Engine, is illustrated in FIGS. 6 and 7.

Well-known conventional engines and engine components relatable to this combustion-and-steam engine system are represented by numbered boxes for brevity to the extent possible. Those requiring special illustration and description, particularly the Nelson Engine and its components, are described and illustrated in greater detail of a preferred embodiment.

A means for providing combustion heat and pressure in the combustion chamber can be a pre-compression fuel-and-air mixer 5 of a conventional type such as an Otto-Cycle carburetor or pre-compression injector and an igniter 6 such as a spark plug or a glow plug. Air as oxidizer and fuel both can be added to the combustion chamber 2 as indicated schematically by pre-compression fuel-and-air mixer 5. There is no need for a cooling system such as a water jacket or cooling fins, however, due to conversion of a select portion of combustion heat to super-heated-steam pressure in the combustion chamber 2 with combustion gases. For this reason, walls 3 and 4 of the combustion chamber 2 are illustrated without a cooling system. The combustion chamber of an Otto-Cycle engine is modified thereby for use as a combustion generator in an Otto-Cycle embodiment of this invention.

Also modified for an Otto-Cycle embodiment of this invention is the mixture ratio of fuel and air at the fuel-and-air mixer 5. A stoichiometric or ideal mixture ratio of fuel and air can be provided for maximum peak heat approximately 1,500 degrees F. higher than from mixture ratios provided generally with conventional carburetors or pre-compression injectors. The additional peak heat is converted into additional pressure of high-pressure steam. The additional peak heat also provides additional combustion pressure with fuel that is wasted conventionally to waste-heat dissipation with fuel-rich mixture ratio. Injection of low-pressure wet steam with the phase-change water injector 1 dissipates peak heat more rapidly than excess fuel in a conventional carburetor system but with increase instead of decrease of pressure resulting from conversion of the low-pressure wet steam to high-pressure dry steam. Water added as wet steam, however, will not be great enough to prevent complete combustion because the amount of water injected is regulated thermostatically to prevent combustion-deterrent levels of wet-steam injection. Steam pressure in proportion to combustion heat and engine heat are maintained at optimum levels by thermostatically controlled injection of wet steam through the phase-change water injector 1.

Pressure provided by the super-heated steam is greater per weight of water than pressure of combustion gases per weight of fuel from ideal mixture ratios of fuel and air or other oxidizer at intolerably high heat in conventional thermodynamic cycles. However, phase-change of the wet steam to high-pressure, super-heated dry steam at an appropriate rate decreases peak combustion heat to tolerable levels for engine materials after sufficient combustion has occurred to assure complete combustion in the Nelson Thermodynamic Cycle. Highest-possible combustion-heat levels are utilized for super-heating low-pressure wet steam that is injected from the phase-change water injector 1. To the extent that injected steam does not prevent completeness of combustion, water added does more work than could be provided from a stoichiometric mixture ratio of fuel and air if there were an engine that would not deform from the resulting peak combustion heat without this combustion-and-steam thermodynamic cycle. Consequently, less water is injected than fuel by weight for optimum power output at tolerable heat levels for engine material.

Duration of pressure from super-heated steam is longer than duration of pressure from combustion gases separately. Combined, the higher peak heat of combustion, the higher pressure of steam with the combustion heat transferred to the injected wet steam and the longer duration of high pressure of steam can be utilized to increase mean-effective pressure from a typical 125 psi to approximately 400 psi in the same structural type of internal-combustion engine, such as a crankshaft engine, modified as a component for a "conventional-engine" embodiment of this invention. As a result, fuel consumption can be approximately one-third and power per weight of the engine can be approximately three times greater with conventional engine forms.

In addition to consuming one third as much fuel, however, the conventional-engine embodiment of this invention will consume approximately one half as much ordinary tap water that has been strained of dirt and insoluble particles. Thus, a car now getting 20 miles per gallon of fuel could get approximately 60 miles from a gallon of fuel and two quarts of tap water with a conventional engine as the combustion component of this combustion-and-steam engine system.

A separate water tank designed to accept only a special water-hose nozzle can be provided on cars. Also provided can be a de-icing system for the water tank and water lines for particular use conditions.

A means for providing combustion which is a modified Diesel-Cycle internal-combustion engine has a high-pressure fuel pump 7 and a post-compression injector 8 which spray-injects fuel into intake air that has been compressed to a relatively high compression ratio in the combustion chamber 2. Waste-heat cooling with a water jacket or cooling fins is not needed for the modified Diesel-Cycle internal-combustion engine, the same as for a modified Otto-Cycle internal-combustion engine as part of this invention. High compression ratio of Diesel-Cycle ignition is not recommended with this invention, however, because it is wasted work load. Compression in excess of what is required for stoichiometric mixture ratio of fuel and air at particular altitudes is not necessary and decreases heat available for generation of high-pressure steam. Instead of compression heat for ignition of fuel as in a Diesel Cycle, electrical heat is recommended as in a phase-change fuel injector to be described hereinafter.

An intake-air compressor 9 in either a modified Diesel-Cycle engine system or a modified turbine-engine system for this invention are separate from a fuel-supply means such as mixer 5 in carburetor form for a modified Otto-Cycle engine system. For the modified Diesel-engine system, the intake-air compressor 9 can be a crankshaft-piston system, a Wankel-piston system or other form of positive-displacement internal-combustion-engine system. For the modified turbine-engine system, the intake-air compressor 9 can be a fan-turbine system or an impeller-turbine system. Modification of either turbine-engine system includes change of the combustors to eliminate orifices for intake of compressed airflow overrun for cooling. Other changes include sizing of combustor nozzles for acceptance of gas volume and pressure of super-heated steam in addition to combustion gases which utilize all compressed air for mixture with fuel for generation of combustion gas.

An on-board-oxidizer source 10 can be used for supplying on-board oxidizer to either a modified turbine engine, a modified liquid-fuel rocket engine or a modified Nelson Rocketjet Engine as part of this invention. For using either type of engine, on-board oxidizer is injected directly into the combustion chamber 2. Modifications of the combustion chamber 2 of a turbine engine for using on-board oxidizer at exoatmospheric altitudes can include positioning of valves in air-inlet ports to prevent back pressure from the combustion chamber 2 into the turbine compressor for some use conditions.

A preferred means for providing combustion has a high-pressure fuel pump 11 that supplies fuel under high pressure from a fuel source to a fuel injector 12 that has a combustion tube 13. The high-pressure fuel pump 11 can be a type which supplies fuel intermittently like a diesel-engine fuel pump or continuously like either a turbine or a liquid-fuel-rocket-engine fuel pump. A primary advantage of a fuel injector 12 that has a combustion tube 13 is effectiveness in achieving combustion for any type of liquid or compressed-gas fuel. Explanation of a phase-change fuel injector with a combustion tube 13 is provided in relation to FIG. 5.

Water for the phase-change water injector 1 is supplied from a water tank 14 through a first water tube 15 to a regenerative water heater 16 that is optional for particular types of heat engines. The regenerative water heater 16 is in heat-exchange relationship with the combustion chamber 2 and/or an exhaust system through which expended combustion gases are expelled from the combustion chamber 2. From the regenerative water heater 16 or directly from the water tank 14 if the regenerative water heater 16 is not used, the water is conveyed through a second water tube 17 to a high-pressure water pump 18. Pumping rate of the high-pressure water pump 18 is controlled thermostatically by steam controller 19 with heat from the combustion chamber 2 and/or heat from an exhaust system of a particular type of heat engine. Like the high-pressure fuel pump 11, the high-pressure water pump 18 can be a type which supplies water intermittently like a diesel-engine fuel pump or continuously like either a turbine or a liquid-fuel-rocket-engine fuel pump. The steam controller 19 can be any of a variety of heat-actuated regulators with a mechanical member that actuates a mechanical control of the high-pressure water pump 18.

Water under pressure from the high-pressure water pump 18 is conveyed by a third water tube 20 to an inside periphery of a fluid chamber 21. Pressure of the water in the fluid chamber 21 first lifts a valve disk 22 from a return-valve seat 30 extended inward radially from valve cylinder 23 in a valve-seat end 24 of the valve cylinder 23. Then the water in the fluid chamber 21 divides into two separate streams flowing in opposite directions. One stream is an injection stream that flows out from the fluid chamber 21 through an injector orifice 25 in communication between a valve side 26 and a heat-tube side 27 of an injector plate 28. The other stream is a return-flow stream that flows past the valve disk 22 in fluid-return conveyances 29 that can be grooves too small for detail to be shown on this drawing or flat surfaces illustrated in FIG. 4 on the circumferential perimeter of the valve disk 22.

The valve disk 22 is pressured in contact with the return-valve seat 30 by a return spring 31 in expansion-pressure relationship between a return-spring shoulder 32 and a return side of the valve disk 22. The return-spring shoulder 32 has an adjustment shaft 33 that is extended through a spring-adjustment orifice 34 in a spring-adjustment wall 35. Adjustment-shaft seal rings 36 can be employed to provide sliding-seal contact of the adjustment shaft 33 with the spring-adjustment orifice 34 in the spring-adjustment wall 35. The adjustment shaft 33 can be positioned linearly with machine threads 37 on a spring-adjustment sleeve 38 to which the adjustment shaft 33 is attached rigidly. The spring-adjustment sleeve 38 can be rotated with a wrench positioned on spring-adjustment bolt head 39 to thread the spring-adjustment sleeve 38 selectively on matching tube threads 40. Positioning of the spring-adjustment sleeve 38 on the tube threads 40 on a spring-adjustment end 41 of the valve cylinder 23 positions the return-spring shoulder 32 to adjust tension of the return spring 31.

Disk shoulders 42 can fit directly on the return-valve seat 30. However, accuracy of construction with the disk shoulders 42 in sealing contact with the return-valve seat 30 and a point of a conical valve-cover extension 43 in sealing contact with walls of the injector orifice 25 simultaneously is difficult and expensive. Therefore, a flexible seal ring 44 is positioned intermediate the return-valve seat 30 and the valve disk 22. The flexible seal ring 44 can be V-shaped with a pointed edge outward circumferentially such that an open side of the V-shape faces inward circumferentially to provide effective sealing and linear flexibility. The V-shaped construction of the flexible seal ring 44 is similar to some spark-plug rings that are used on Otto-Cycle engines. It allows the conical valve-cover extension 43 or other valve-cover portion of the disk valve 22 to be lifted from sealing contact with the injector orifice 25 slightly ahead of lifting of the flexible seal ring 44 from sealing contact with the return-valve seat 30.

Crucially different between this valve disk 22 and conventional fuel-return valves in diesel-fuel injectors is that return-flow sealing is achieved by spring-pressured contact of return-valve seat 30 and disk shoulder 42 of what is, in effect, a poppet valve instead of depending on close fit of a shaft in a sleeve or tube. The close fit of a shaft in a sleeve of conventional diesel-fuel injectors requires lubricity of the fuel or other liquid being pumped. It is not suitable for injecting water or lighter fuels such as gasoline, alcohol and liquified petroleum gas for which the form of poppet-valve system of this invention is provided. A poppet-valve seal does not require lubrication of its sealing surfaces.

The injector orifice 25 leads into a steam tube 45 that extends from the heat-tube side 27 of the injector plate 28 to contact with the first wall 3 of the combustion chamber 2 of a heat engine that provides an electrical ground. The steam tube 45 can be an electrical-resistance heater tube that is supplied with electrical current from an engine-electrical source 46 through an electrical line 47. Heat-tube insulation 48 is positioned intermediate an outside periphery of the steam tube 45 and an internal periphery of a steam-injector stem 49 that is attached rigidly to the first wall 3 of the combustion chamber 2. The electrical line 47 is insulated with line insulation 50.

Alternatively for some design objectives, the steam tube 45 can be an integral part of the steam-injector stem 49. For this alternative, water is spray-injected into the post-compression pressure of a combustion chamber 2 that extends into the steam tube 45. Only heat from the first wall 3 or other combustion-chamber wall is transferred to the steam tube 45 or to the steam-injector stem 49 to heat spray-injected water en route to the combustion chamber 2. For this alternative, a higher cooling effect but lower steam pressure is derived from water injected. For either alternative, the spray-injected water is heated sufficiently to become low-pressure wet steam en route to the combustion chamber 2.

For various use conditions, the steam tube 45 can be constructed with or without resistance heating or provided with variable levels of resistance heating. When provided with variable resistance heating, variation of resistance heat provided can be controlled thermostatically, the same as for thermostatic controls of amount of water that is phase-change injected.

Variation of resistance heat added to the steam tube 45 can be utilized for (a) adjustment of heat levels to rate or water injection and (b) adjustment of electrical current per particle conductivity of wet steam for electrolytic dissociation. This combination of heat controls increases range of fuel-injection rate and operational power with optimal thermal efficiency.

Due to the range of options for the steam tube 45, it is referred to generally as a phase-change tube. It is where atomized water is changed to a mix of (a) wet-steam water particles, (b) gaseous steam, and (c) dissociated hydrogen and oxygen.

Not included in the steam tube 45, however, are (a) heat transfer to the steam tube from engine exhaust, (b) injection from the steam tube 45 into a pre-combustion chamber of an engine system, and/or (c) injection from the steam tube 45 into a pre-compression mechanism of an engine system. Reasons are that there is not enough heat remaining in exhaust from an effective combustion-and-steam thermodynamic system for effective transfer to and use in the steam tube 45. Injection of steam from the steam tube 45 into a pre-combustion chamber of an engine system would douse flame under fuel-rich-mixture conditions which subject heat generation to vulnerability of dousing flame with the steam. Injection from the steam tube 45 into a pre-compression mechanism, such as a carburetor or intake manifold, causes steam to expand prematurely if it is heated sufficiently to create expansion pressure. Also, pre-compression injection of water particles deters flame generation by a spark plug or other ignition means if it is not heated sufficiently to create reverse-rotation expansion pressure.

A stem seal ring 51 can be positioned between a seal surface 52 on the first wall 3 and ends of both the steam-injector stem 49 and the heat-tube insulation 48. An inlet orifice 53 of a desired size and shape can be provided to convey steam from an outlet end of the steam tube 45 to the combustion chamber 2. Various fastener means can be employed for attachment of the steam-injector stem 49 to the first wall 3. A sleeved nut 54 with internal threading onto an attachment boss 55 to buttress against a snap ring 56 on the steam-injector stem 49 is one convenient fastener method for some use conditions.

A combustion-chamber end of the steam tube 45 can be positioned in direct fluid communication with the combustion chamber 2 as an alternative means of communication between the steam tube 45 and the combustion chamber 2. Either the inlet orifice 53 in the first wall 3 of the combustion chamber 2 or the combustion-chamber end of the steam tube 45 can be employed as a fluid communication means, such as a conduit, intermediate the combustion-chamber end of the steam tube 45 and the combustion chamber 2. For use of the combustion-chamber end of the steam tube 45 as the fluid communication means intermediate the combustion-chamber end of the steam tube 45 and the combustion chamber 2, the combustion end of the steam tube 45 and the inlet orifice 53 can have taper-fit portions that position the combustion-chamber end of the steam tube 45 in direct contact with the combustion chamber 2. The stem seal ring 51 can be tapered for seal-fit between a tapered seal surface 52 and a tapered combustion-chamber end of the steam tube 45.

Water that is not injected as steam returns to the water tank 14 through a water-return tube 57 or other fluid conveyance in fluid communication between the valve cylinder 23 and the water tank 14. This return-flow allows injection of steam into small combustion chambers accurately. However some engines with constant high flow rate instead of intermittent injection can employ this phase-change water injector 1 with only the steam tube 45. An alternative embodiment of the phase-change water injector 1, therefore, can include all portions described fluidly downstream from the fluid chamber 21. The valve disk 22 also can be omitted. In its place can be a rigid wall which defines a head of the fluid chamber 21 for a continuous-flow phase-change water injector for such uses as turbine engines and rocket engines. Continuous-injection engines also can benefit from the return flow, however. It provides an injection-governing effect.

Referring to FIGS. 1–3, the orifice cover on a central portion of the seal side of the valve disk 22 can be a conical extension 58 with a rounded tip 59 instead of a pointed tip that is positional in sealing relationship to a corner edge 60 of the injector orifice 25 as shown in FIG. 2. Alternatively, the rounded tip 59 can be positional in sealing relationship to coned edge 61 of an entrance to the injector orifice 25 as shown in FIG. 3. For either the FIG. 2 or the FIG. 3 embodiment of this component, roundness of the rounded tip 59 decreases tolerance requirement for concentricity of the axes of the valve disk 22, the injector orifice 25 and the conical extension 58 in operating conditions.

Referring to FIGS. 1 and 4–6, a valve-disk concentricity guide 62 is extended as a sleeve from the return side of the valve disk 22. Its primary function is to maintain axial concentricity of the valve disk 22 in order to position any form of a central valve-cover section of the valve disk 22 centrally on the injector orifice 25 in concentricity with an axis of the injector orifice 25. For flat forms of valve disk 22, a function of the valve-disk concentricity guide 62 is to maintain parallelism of the seal side of the flat valve disk 22 with an injector plate 28 that is flat at a position of sealing contact with the flat seal side of the valve disk 22. In addition but secondarily, the valve-disk concentricity guide 62 also maintains the return spring 31 centrally on the return side of the valve disk 22. However, in its function of maintaining concentricity of the valve disk 22, the valve-disk concentricity guide 62 cannot be in sufficiently close sliding contact with an inside wall 63 of the valve cylinder 23 to create friction. In order to maintain concentricity while allowing return flow of fluid past the circumferential perimeter of the valve disk 22 and yet not create friction from sliding contact, one or more flat surfaces 64 are provided on a circumferential outside periphery of the valve disk 22 and continued linearly on a circumferential outside periphery of the valve-disk concentricity guide 62 as shown in FIG. 4. Channels or grooves can be employed in lieu of the flat surfaces 64 for some use conditions and for some types of liquid.

Referring to FIG. 5, a phase-change fuel injector 65 can be employed in combination with a phase-change water injector 1. The phase-change fuel injector 65 is similar to the phase-change water injector 1 except for inside diameter and length of the combustion tube 13 in comparison to inside diameter and length of the steam tube 45. For the combustion tube 13, inside diameter is greater and length is shorter than for the steam tube 45. Larger diameter of the combustion tube 13 allows rapid, peak-heat expansion of combustion gases. Shorter length of the combustion tube 13 allows rapid entry of fuel-rich combustion gases into the combustion chamber 2 of heat engines.

Further similar to the steam tube 45, the combustion tube 13 can be heated electrically through an electrical line 47 from the engine-electrical source 46. As for the steam tube 45, electrical heat of the combustion tube 13 is an option for particular design objectives. Material suitable for a resistance heater of either the combustion tube 13 or the steam tube 45 can be used also for retaining heat of combustion for transfer to spray-injected fuel or water. Either can be used as a heat retainer with or without electrical connection to the engine-electrical source 46. When constructed from resistance-heater material and connected to the engine-electrical source 46, the combustion tube 13 and the steam tube 45 separately can be resistance heaters when current is supplied from the engine-electrical source 46 and heat retainers when current from the engine-electrical source 46 is turned off for various operating conditions.

Longer length of the steam tube 45 contains steam for a period of time during conveyance to the combustion chamber 2. For most applications, water and fuel will be injected at the same time in order to minimize and to equalize phase-change-tube pressures into which they are injected. With the longer steam tube 45, wet steam in the steam tube 45 will not reach the combustion chamber 2 until after combustion gases have dispersed throughout the combustion chamber 2 and completeness of combustion will be sufficient to assure a design level of completeness of combustion in the presence of wet steam emerging from the steam tube 45.

In addition, minute water particles in wet steam in the steam tube 45 will be contained in close proximity that exists for wet steam, even though heat applied in the steam tube 45 would cause expansion into dry steam without in-transit confinement in the steam tube 45. This increases rate of pressure increase of the steam as it merges from the steam tube 45 into the combustion chamber 2 for maximum power generation. This also assures completeness of conversion of water to high-pressure dry steam in addition to assuring completeness of combustion.

The steam tube 45 differs further from other steam tubes and conveyances of water and/or steam to a combustion chamber 2 in that first, its internal perimeter, whether circular or rectangular, is relatively small in proportion to a stream of water or atomized particles of water sprayed into the steam tube 45 through injector orifices 25. As a result, water or steam and particles of water changing progressively to steam within the steam tube 45 are restricted designedly from expanding laterally or radially while being allowed to expand linearly within the steam tube 45 when traveling linearly from the injector orifice 25 to the combustion chamber 2.

Second, there is no restriction, confinement, nozzle effect or other decrease of inside periphery of the steam tube 45 where it enters into the combustion chamber 2. Instead, the cross-sectional area of the inlet orifice 53 for exit from the steam tube 45 into the combustion chamber 2 is approximately the same as the cross-sectional area of the inside of the steam tube 45 immediately next to the inlet orifice 53. This allows water atomized by injection through injector orifices 25 to be phase-changed and dissociated designedly within the steam tube 45 while in transit from the injector orifice 25 to the combustion chamber 2 without a thermodynamic penalty of workload loss by a constrictive injector means.

The inlet orifice 53 preferably has a very small cross-sectional area for concentration of liquid and/or gas pressure inside of the steam tube 45 in proportion to pressures in the combustion chamber 2. This allows a lower pressure per area unit in the steam tube 45 to be injected into a higher pressure per equal area unit in the combustion chamber 2. It is preferable to provide the small cross-sectional area of the inlet orifice 53, not by means of a nozzle or verturi restriction but by means of small cross-sectional area of the steam tube 45 throughout its length. Cross-sectional area of the steam tube 45 can increase or remain constant but not decrease significantly intermediate the injector orifice 25 and the inlet orifice 53.

For some design objectives, the regenerative water heater 16 can be in heat-exchange relationship with the phase-change fuel injector 65 at a position proximate a fuel-injector stem 75 where combustion heat has less opportunity to be cooled with steam from the phase-change water injector 1. However, combustion heat in the fuel-injector stem 75 and in the combustion tube 13 is lower than peak heat in the combustion chamber 2 because of fuel-rich mixture prior to mixture of all fuel, including dissociated hydrogen, injected with all air and/or other oxidizer in the combustion chamber 2. For this reason it is optional whether cooling relationship of a regenerative water heater 16 is employed.

Owing to higher pressure and higher expansion ratio per heat level of steam than fuel and oxidizer, complete phase-change of all water injected to high-pressure dry steam can be achieved at an average temperature which does not deform engine materials. In addition, pressure of steam endures at a high medium range throughout strokes of combined combustion and steam pressure. Low piston speed and high constant leverage throughout strokes are provided to utilize these high, constant pressures most advantageously with a Nelson Engine that is described in relation to FIGS. 6–7. Similar advantages apply to the Nelson Rocketjet Engine. However, a large portion of the Nelson Cycle advantages can be applied for all forms of heat engines.

The phase-change water injector 1 shown on the left side of FIG. 5 can have a valve disk 22 with a flat valve-cover portion in parallel sealing relationship to a raised injector-plate seal 66. A surface of the raised injector-plate seal 66 is in a common plane with the return-valve seat 30. This allows simultaneous finish-machining of the return-valve seat 30 and the raised injector-plate seal 66 accurately, such that a flat valve disk 22 can be employed for sealing both injection and flow return.

In a bottom portion of FIG. 5, a combustion chamber 2 without a water jacket or cooling fins for waste-heat cooling is shown bounded by a crankshaft piston 67, by cross-sectional walls 68 and by a cylinder head 69. The absence of waste-heat-cooling means applies similarly to all "combustion-heat-pressure" engines, whether having intermittent combustion like an internal-combustion engine or having continuous combustion like a turbine or rocket engine. Excluded are conventional steam engines.

Engines with dead-center conditions and low leverage of power-take-off means during peak-combustion heat and pressure must transfer a large portion of such heat to a cooling system to prevent heat-distortion or melting of the engine material. Typical of engines with dead-center and low-leverage at peak heat are those employing a crankshaft or, worse yet, the Wankel Engine with combustion pressure on a base of a triangular piston in elliptically reciprocative travel.

Different from low mechanical advantage from inherently flat drive angles of present forms of cam-drive engines, the Nelson Engine has steep drive angles in combination with constantly high leverage and minimal friction with multiple-roller drive for longer use-life than any other type of engine. Swash-plate engines and the various other forms of barrel engines, also known as cam engines, have low mechanical advantage from inherently low drive angles of cam slopes, even though having high leverage throughout strokes. They require high heat dissipation to compensate for low mechanical efficiency in transferring linear travel to rotary motion. Some barrel engines also have very short use life as a result of single-roller contact per piston.

Different from the phase-change water injector 1, the phase-change fuel injector 65 utilizes a fuel tank 70, a regenerative fuel heater 71 that is optional for particular engine types, a high-pressure fuel pump 72, a high-pressure fuel line 73 and fuel-return tube 74. Also, the combustion tube 13 and heat-tube insulation 48 are contained within a fuel-injector stem 75 that is shorter than the steam-injector stem 49. Optionally for some design objectives, the regenerative fuel heater 71 can be in heat-exchange relationship with the fuel-injector stem 75. This is an alternative to constructing the regenerative water heater 16 in heat-exchange relationship to the fuel-injector stem 75 as described above.

Owing to relative shortness of the fuel-injector stem 75, a fastener means different from the sleeved nut 54 or other steam-injection fastener means can be employed for attaching the phase-change fuel injector 65 to cylinder head 69 or to such other first wall 3 of a combustion chamber 2 as applicable for a particular engine type. One design option is using housing fastener bolts as illustrated to attach apposite ends 24 and 41 of the valve cylinder for attachment also to either wall 3, 4, 68, 69 or other wall of a combustion chamber 2.

Low-pressure fuel lines 76 are used for fuel conveyance between the fuel tank 70 and the high-pressure fuel pump 72. Designation of high pressure and low pressure lines does not necessarily convey difference of types of lines but of their use. The high-pressure and low-pressure lines can be the same or different, depending on design factors for particular use conditions and economics of different types of lines.

An optional difference between the phase-change water injector 1 and the phase-change fuel injector 65 is use of valve disk 22 with a flat seal side and a coplanar or flat orifice cover for the phase-change water injector 1 and a valve disk 22 with a conical valve-cover extension 43 for the phase-change fuel injector 65. This difference is entirely optional for particular use conditions and design preferences. Either type of valve disk 22 can be used with either type of injector 1 or 65. However, requirements for accuracy are not as demanding for water injection in some use conditions, such that the flat valve disk 22 can be employed if desired. The preferred embodiment of this component is the conical extension 58 with a rounded tip 59 in combination with either a corner edge 60 or a coned edge 61 of an injector orifice 25 as shown in FIGS. 2–3. Use of the flexible seal ring 44 also is preferred to direct seating of the valve disk 22 on the return-valve seat 30. As a production alternative, an injector-plate insert 77 can be either press-fit or screwed into the injector plate 28 as shown in the phase-change fuel injector 65. If made to be screwed in and out for ease of cleaning and replacement for lower cost of production, a wrench-socket orifice 78 can be employed externally to the injector orifice 25.

Reference is made now to FIG. 6. A Nelson Engine 79 with a combustion-and-steam thermodynamic cycle is a preferred embodiment of this invention. It has high rotational leverage and steep drive angles to convert high pressure of peak combustion and super-heated steam to rotary motion constantly throughout each stroke of a double-ended piston. Friction is low with roller drive. Typically, twelve pairs of wear-adjustment rollers in roller-thrust-bearing contact with a drive-cam thrust plate at slow contact speed can have a use-life as long as durable roller-thrust bearings. Aiding long use-life in combustion sections is absence of side-pressure of pistons on cylinder walls, resulting in turbine-type bearing wear with less than ten percent of wear-generating speed of contacting surfaces for several times the use life of turbine engines.

The Nelson Engine 79, described in relation to FIGS. 6–7, improves and combines the most advantageous features of all heat engines and power-conversion mechanisms for employing this combustion-and-steam engine system. Some of the advantageous features of this invention include the following:

Higher leverage than turbines per pressure generation;

Absence of dead-center conditions whenever pressure exists;

Higher positive-displacement peak pressure per piston-surface area than possible for any other engine system;

Constant high leverage throughout strokes;

Duration of high pressure throughout strokes;

Steep cam-drive angle;

Low friction of roller drive;

High plurality of rollers in simultaneous roller-thrust-bearing contact with cam surfaces;

Large piston surface per cylinder surface independently of stroke length;

Rotational power takeoff remote from combustion heat;

Conversion of peak combustion heat to rotation without containment of dead-center pressure;

Conversion of high heat of stoichiometric combustion to high pressure of superheated steam with long pressure duration throughout entire high-leverage stroke lengths;

Electrical-resistance transfer of combustion heat to intake fuel and water regeneratively;

Short length for low weight of components between working sections of the engine;

Absence of side pressure for liquid-lubricant requirements in combustion-heat sections;

Utilization of nearly all reciprocative momentum for compression;

Isolation of nearly all directional-change pressures from the roller cam drive; and Efficient utilization of dissociated hydrogen and oxygen.

Theses could be written on each of these advantages in addition to the engine independently. The Nelson Engine 79 using this combustion-and-steam engine system has characteristics of a roller drive of turbine-type inclines with thermodynamic efficiencies greater than possible with any other type of engine. The Nelson Drive independently has characteristics of a roller thrust bearing that is overdesigned six times to provide unsurpassed duration of low-friction use life.

Also with the Nelson Engine 79, fertilizing forms of nitrogen can be generated and condensed from exhaust more completely. A small portion of exhaust that is polluting can be less than one percent per fuel consumption of any type of conventional engine. Using less than one-fifth as much fuel per power as conventional engines and emitting less than one percent as much pollution per fuel consumption is like having only one of every five hundred cars on the road generating smog. All the rest, in effect generate liquid fertilizer that aids plant life and improves instead of harming the atmosphere.

Non-polluting exhaust of the Nelson Engine and the Nelson Rocketjet Engine is made possible by a combination of:

A. No exhaust discharge of partially burned fuel with combustion-supportive heat of cylinder walls;

B. Complete combustion with ideal stoichiometric mixture ratio of fuel and oxidizer;

C. No formation of stable nitrous oxides in short duration of high temperatures under high pressure with rapid temperature drop due to phase-change of wet steam into high-pressure dry steam and absence of dead-center containment of pressure;

D. Non-use of engine oil by sealing combustion sections with non-lubricated-sold surfaces;

E. Use of one-twentieth-to-one-fifth of the fuel per power output of various engine types; and F. Absorption of nitrogen by water molecules.

In the Nelson Engine 79, a phase-change water injector 1 described in relation to FIGS. 1–5 and a phase-change fuel injector 65 described also in relation to FIGS. 1–5, are positioned in working relationship to a combustion chamber 2 at a drive end 80 and a compressor end 81 of a double-ended power cylinder 82. Steam-injector stems 49 of phase-change water injectors 1 are positioned to direct timed cyclic flow of steam into each end of the double-ended power cylinder 82. In a similar manner, fuel-injector stems 75 are positioned to direct timed cyclic flow of combustion gases into each end of the double-ended power cylinder 82. For even dispersement of heat, the phase-change water injectors 1 are offset circumferentially from the phase-change fuel injectors 65.

A double-ended power piston 83 is shown at a compression end of a stroke, which is also a beginning of a power stroke. A power shaft 84 is extended in sliding-seal relationship through a drive-attachment sleeve 85 to a drive gear 86 having preferably four drive arms 87 extended radially in sliding contact with a linear transverse-guide slot for each drive arm 87 in a transverse guide 88 that is attached to a base plate 89. Attached to radial ends of the drive arms 87 is a roller ring 90 to which preferably twelve pairs of drive rollers 91 are attached rotationally to roller axles 92.

The drive rollers 91 are extended into a drive channel 93 formed intermediate a drive-side end cam 94 and a cylinder-side end cam 95 which are attached circumferentially to a drive sleeve 96. The drive sleeve 96 forms a floor of the drive channel 93. Attached to the drive sleeve 96 linearly forward is a drive plate 97 which is attached centrally to a drive shaft 98 that is rotational in a drive-shaft housing 99. The drive-shaft housing 99 is extended linearly forward from a drive-housing plate 100 that is attached to a drive-housing sleeve 101 which is attached to the base plate 89. A front thrust bearing 102 is positioned intermediate the drive plate 97 and the drive-housing plate 100. A rear thrust bearing 103 is positioned intermediate the drive plate 97 and a drive-shaft end of the transverse guide 88. Pairs of two drive rollers 91 are provided to prevent friction from change of direction of rotation of the drive rollers 91 when contacting opposite sides of the drive channel 93.

Additional detail related to this power-takeoff means, the Nelson Engine 79 and the Nelson Rocketjet Engine is taught and described in U.S. Pat. Nos. 3,916,702, 3,570,463 and 5,222,361 granted to Daniel E. Nelson and Anju Nelson.

Intake air is first-stage compressed or supercharged in double-ended compressor cylinder 104 and directed into the double-ended power piston 83 through a double-ended compressor piston 105. From inside of the double-ended power piston 83, first-stage compressed or supercharged intake air is directed into the combustion chamber 2 through compressor-end ports 106 when the double-ended power piston 83 is at the drive end 80 of the double-ended power cylinder 82 and exhaust ports 107 are exposed for discharge of exhaust gases into exhaust ring 108 and into exhaust pipes 109. At an opposite end of piston travel, first-stage compressed or supercharged intake air is directed from inside of the double-ended power piston 83 through drive-end ports 110 when the double-ended power piston 83 is at a compressor end 81 of the double-ended power cylinder 82 and exhaust ports 107 are exposed for discharge from the drive end 80 of the double-ended power cylinder 82.

The ports 106, 107 and 110 are illustrated as being relatively small in proportion to stroke length. This is possible because of relatively slow piston speed that allows ample time for escape of exhaust gases through exports 107 and intake of air through alternately compressor-end ports 106 and drive-end ports 110. Another factor making small ports possible is high power per weight of the engine, permitting it to be larger and slower while yet being smaller than other engine systems per power output. Positioning of the exhaust ports 107 and intake ports 106 and 110 circumferentially for a short piston stroke also allows the ports to be smaller. The piston speed allows ample time for wet steam as injected to change phase to superheated, high-pressure dry steam in the presence of high combustion heat in the combustion chamber 2.

Exhaust is being discharged radially through exhaust ports 107 at a central portion of the double-ended power cylinder 82 while first-stage compressed or supercharged intake air is entering radially through alternately compressor-end ports 106 and drive-end ports 110 at discharge ends of travel of the double-ended power piston 83. At approximately the same time that exhaust gases are being discharged through exhaust ports 107, fuel is phase-change injected with phase-change fuel injector 65 into combustion chamber 2 which contains compressed air at an opposite side of the double-ended power piston 83 alternately at the end of each stroke. At approximately the same time that fuel is phase-change injected, water is phase-change injected also into the combustion chamber 2 at the same side of the double-ended power piston 83 that fuel is phase-change injected alternately at a compression end of each stroke.

Phase-change injection of fuel is timed to occur when the drive rollers 91 are at or slightly beyond dead center of cam peaks 111. Although water is phase-change injected into the same combustion chamber 2 at approximately the same time as fuel, longer length of the steam tube 45 of the phase-change water injector 1 relative to shorter length of the combustion tube 13 of the phase-change fuel injector 65 allows peak heat and designed completeness of combustion to occur in the combustion chamber 2 before steam with designed wetness enters the combustion chamber 2 from the steam tube 45. Delay of steam entry due to time consumed for travel through the length of the steam tube 45 consumes a design percent of piston travel and a corresponding design percent of roller travel down cam peaks 111 and cam slopes 112 of the drive channel 93. Generation of peak heat and peak combustion pressure before conversion of peak heat to super-heated-steam pressure consume this same design percent of piston travel in combustion-and-steam power strokes alternately.

Initial rising combustion pressure is utilized to aid directional change of reciprocative travel during cam-peak portions of power strokes. Then high pressure from combustion of both hydrocarbon fuel and hydrogen exists for a short duration before converting to higher steam pressure while there is full mechanical advantage of a steep drive angle of the drive cam slopes 112. Throughout the remainder of constant, high-leverage power strokes, high-pressure superheated steam provides constantly high pressure for conversion to output work. Mean-effective pressure is typically in excess of 600 psi, over five times that of conventional Otto-Cycle or Diesel-Cycle engines. Under ideal conditions for particular applications and design objectives, mean-effective pressure can be as high as 800-to-1,000 psi for embodiments using forms of the Nelson Engine 79.

Linear motion of each reciprocative stroke is arrested mostly by compression pressure at surfaces of both the double-ended power piston 83 and the double-ended compressor piston 105. Then opposite-directional travel is initiated almost totally by the initially rising combustion pressure. Cam valleys 113 aid in arresting and initiating reciprocative travel mostly by smooth control of directional change. Only 10-to-20 percent of the work load of reciprocative directional change is born mechanically by the cam peaks 111 and the cam valleys 113, resulting in very low friction from reciprocation.

The cam slopes 112 are represented as straight lines at 35-degree angles of slope from reciprocative linear travel of the drive rollers 91. Actually, the slopes are not straight. Preferably, they are blends of cycloidal curves that are near straight but curved slightly to avoid any abruptness of directional change for most of the distance between cam peaks 111 and cam valleys 113. Only small central portions of cam slopes 112 are straight at a drive angle that is preferably between 30 and 35 degrees.

The drive rollers 91 can be tapered as shown or straight-walled. A slight decrease of friction is achieved with tapered drive rollers 91 and matching-tapered end cams 94 and 95. As a result of constantly changing cam slopes 112, there is slight sliding contact with either tapered or straight drive rollers 91. The primary function of tapered drive rollers 91 is inward adjustment to compensate for wear when desired for particularly long use-life. The drive rollers 91 are made slightly sacrificial in wear to the end cams 94 and 95. Use-life can be increased from approximately 500,000 miles to 2,000,000 miles in a car or truck with tapered drive rollers 91. Use-conditions are comparable to thrust roller bearings with idealized ratio of roller-bearing size per work load. Use-life of either tapered or straight drive rollers is longer than need be for most purposes.

Inward adjustment for wear occurs automatically with slightly "over-tapered" drive rollers 91. They tend to travel inwardly when tapered for rotating in a circumferential path slightly smaller than provided by the end cams 94 and 95. A retainer ring in combination with a desired form of leaf spring can be used to assure contact of the drive rollers 91 with the end cams 94 and 95. Then the relative taper causes continuous contact. For straight drive rollers 91, a retainer ring and rigid keeper can be employed to keep the straight drive rollers in position on the roller axles 92. A compensating advantage of straight drive rollers is low cost for precision production of the end cams 94 and 95 without tapered walls of the drive channel 93.

Mechanical efficiency of the Nelson Drive employed is approximately 97 percent as compared to 85 percent for crankshaft and turbine power-takeoffs. There is no side-pressure of swinging connecting rods that decreases mechanical efficiency with increase in piston speed. High pressure on a piston in proportion to pressure against cylinder walls with short strokes is achieved with typically eight times the leverage per stroke length of crankshaft engines. These advantages allow peak combustion pressure and enduring high steam pressure to be converted to rotational output efficiently and thoroughly.

In a preferred design of the Nelson Engine 79, there are 24 combustion strokes per engine revolution with 12 sets of drive rollers 91. This is as many power strokes per revolution from one piston as from 96 crankshaft pistons in a conventional four-stroke engine. Every stroke is a power stroke. With four-to-ten times the mean-effective pressure, six-to-eight times the leverage constantly throughout strokes without dead-center, high mechanical efficiency and low weight of the engine system, horsepower generated is approximately five pounds per pound of engine instead of typically five pounds of engine per horsepower. Engine torque can be up to 80 but is rated at 25 foot-pounds-per-horsepower instead of one-to-five for conventional engines, making wheel-turning power of the engine over 25 times greater than for present vehicle engines per horsepower.

Reference is made now to FIG. 7. A first Nelson Engine 114 is joined in opposed-piston relationship to a second Nelson Engine 115 by means of a transmission 116 with which drive shafts 98 of the two engines 114 and 115 are attached rigidly to a shaft coupling 117 on a coupling gear 118 which rotates a single output gear 119. This provides an opposed-piston Nelson Engine that is completely smooth with total vibration damping. Different from opposed-piston crankshaft engines, there is no swinging-connecting-rod vibration that is particularly difficult to dampen out. With all vibration in opposite directions, it can be made as smooth as a turbine engine.

The transmission 116 can have variable or fixed gear ratio. For cars and many similar applications, the output gear 119 can be made to provide rotational speeds equivalent to conventional engines for adaptation to present automatic transmissions. A special transmission is planned to provide variable gear ratio smoothly with positive drive for most applications. For slow-rotational applications such as ships and helicopters, however, the output gear 119 can be made to provide optimal speed for attachment directly to various drive shafts.

Engine oil is not used in a combustion section of any form of the Nelson Engine or Nelson Rocketjet Engine. This decreases exhaust pollution further yet. Engine oil is not necessary because of the absence of side pressure in linear travel of the double-ended power pistons 83 and double-ended compressor pistons 105. Without side pressure in a combustion section for converting linear travel of a piston to rotation of an output shaft as there is in crankshaft engines and other forms of internal-combustion engines, non-lubricating solids can be employed instead of liquid lubricants such as engine oil. As in Turbine-engine practice but more so with slower travel of contacting surfaces in Nelson Engines, non-lubricating solids can be adhered to surfaces or used for construction of parts having sliding or rotational contact. High heat of combustion makes non-lubricating solids more effective by decreasing their coefficient of friction and increasing their use life.

Non-lubricated solids are alloys of special high-temperature metals. Non-metals such as ceramics, cermets and oxides of metals are included in some non-lubricating solids, making them combinations of materials rather than alloys within the normal definition of alloys. For this application, non-lubricated solids require either the use of powder-metallurgy practices for their construction or metal-coating practices for their adherence to surfaces of other metallurgical structures.

Characteristics of a typical Nelson Engine using the Nelson Thermodynamic Cycle made possible by this invention are:

| | |
|---|---|
| power piston diameter | 3.14 inches (80 millimeters) |
| stroke length | 1.57 inches |
| valve-port length | 0.07 inches |
| effective stroke length | 1.5 inches |
| power-shaft diameter | 1.57 inches |
| strokes per revolution | 24 |
| revolutions per minute | 2,000 |
| mean-effective-pressure | 600 psi |

Net Area of Piston=area of piston−area of shaft diameter= (1.57×1.57×3.14)−(0.785×0.785×3.14)=5.805 sq. inches Horsepower=33,000 foot-pounds of work per minute= inches of effective stroke length/inches per foot×net square inches of piston/square inches per foot×mep×square inches per foot×strokes per revolution×revolutions per minute/33, 000=1.5/12×5.805/144×600×144×24×2,000/33,000=633 horsepower from a 150-pound engine (motorcycle-engine weight) with a single piston Torque=25 foot-pounds-per-horsepower=25×633=15,825 foot-pounds of torque (large-truck-engine power sufficient for uphill travel fully loaded as fast as cars, a large helicopter engine or a military tank engine with motorcycle-engine weight)

Opposed-piston model with total vibration damping for turbine-like smoothness=1,266 horsepower from a 400-pound engine (compact-car-engine weight)

Torque=25 foot-pounds-per-horsepower=25×1,266=31, 650 foot-pounds of torque (train-engine power from compact-car-engine weight at nominal mean-effective pressure)

Mean-effective pressure can be 1,000-to-1,500 psi as a result of peak pressure of ideal combustion followed by long-enduring high pressure of superheated dry steam throughout combustion strokes.

Complete combustion of fuel and oxidizer in combination with complete phase-change of water to high-pressure steam simultaneously in a combustion enclosure with engine materials maintained at integrity-supportive heat levels is accomplished and combustion of hydrogen dissociated from oxygen in water is achieved by:

A. Spray-injection of designedly pre-heated water into the heat tube 45 for fine atomization to (1) minimize phase-change heat required for phase-change to wet steam and (2) to aid phase-change of the pre-heated water to wet steam in the heat tube 45;

B. Phase-change heat provided in the steam tube 45 by red-hot heat of walls of the steam tube 45 with resistance heat from engine electrical system;

C. Close proximity of spray-atomized water to heated walls of by small diameter of the heat tube 45;

D. Addition of sufficient heat to wet steam in the heat tube 45 to support complete combustion of fuel and oxidizer in the combustion chamber 2;

E. Sufficient length of the heat tube 45 for transit time of wet steam to delay entry of the wet steam into the combustion chamber 2 until after attainment of a design level of combustion completeness and combustion heat;

F. Addition of combustion-supportive oxygen and hydrogen from heat of atomized water and electrolysis of wet steam with electrical-resistance heating in the heat tube 45;

G. Thermostatic control of quantity of wet steam added to assure (1) design heat of engine materials, (2) heat for design pressure of superheated steam in combination with combustion gases, and (3) heat for design completeness of conversion of wet steam to superheated dry steam;

H. A phase-change fuel injector that assures complete and rapid (1) phase-change-heating of spray-injected fuel, (2) thorough mixture of a pilot portion of oxidizer with the heated fuel, and (3) un-restricted expansion of fuel-rich pilot combustion into combustion chamber 2; and I. High rotational leverage in combination with absence of dead-center resistance of a rotational power-takeoff to expansion pressure of combustion and high-pressure steam.

Exclusive of effects of pressure from superheated steam and combustion of dissociated hydrogen, thermal efficiency a Nelson Engine or a Nelson Rocketjetjet Engine using the Nelson Thermodynamic Cycle is about 77 percent in contrast to the 15-to-30 percent for conventional internal-combustion engines, 30-to-35 percent for conventional turbine engines and the 44 percent for regenerative steam-turbine power-plant engines. This is because thermal losses in the preferred Nelson-engine uses of the Nelson Thermodynamic Cycle are only about 6 percent to exhaust, 9 percent to wet-steam phase-change, 3 percent to radiant heat and 5 percent to friction. Fuel use per power would be proportional at about one-fifth-to-two-fifths of conventional internal-combustion engines but for additional pressure of super-heated steam generated by the fuel heat.

Additional pressure from superheated steam varies from one-to-two times the pressure of combustion gases from fuel and oxidizer, resulting in two-to-three times the pressure available from combustion gases at 77 percent thermal efficiency. This is the equivalent of 154-to-308 percent thermal efficiency from use of fuel and oxidizer only. Longer duration of superheated steam enhances these effects further yet for both the Nelson Engine and the Nelson Rocketjet Engine.

In principle but to a far less degree, the Nelson Thermodynamic Cycle is like releasing fission energy with chemical explosion and then using expansion pressure from both the nuclear reaction and the chemical reaction for either rotational or thrust power. In effect, additional energy is provided from hydrogen without either (a) uneconomical dissociation from oxygen in water for its chemical use or (b) untenable heat for its atomic use.

Hydrogen is dissociated from oxygen in atomized water in the heat tube 45 by electrolysis of heated molecules of water as wet steam. Due to slight electrical conductivity of foreign particles in normally constituted water, an electrical field exists and causes electrolytic action between electrically charged walls of the heat tube 45 and the foreign particles in the water. The amount of electrolysis can be increased by presence of foreign particles such as salt that is contained in clean sea water.

Use of hydrogen and oxygen from electrolysis is advantageous to the extent that: (a) the electrical field does not short-circuit resistance-heating of the walls of the steam tube 45; (b) the energy required for their electrolytic generation does not exceed about 75 percent of energy obtained from their use, and (c) the energy obtained equals or exceeds phase-change losses for obtaining high-pressure dry steam. Level of electrolysis can be controlled by relative purity and content of salt, mixtures of different salts or existence of other conductive particles such as minerals in the water. Most naturally existing fresh, mineral and sea water that is void of solids is suitable with differences of efficiency due to water-particle conductivity.

Designedly, an increase of about 20-to-50 percent efficiency can be obtained from dissociation of water and use of the hydrogen and oxygen obtained for combustion of fuel and hydrogen. A minimum of about 10-to-20 percent increase will occur normally from an economical level of purity of fresh water added.

Mechanically, eight times the leverage constantly throughout strokes and up to ten times the mean-effective pressure of combustion gases alone provide still further power from Nelson Engines using the Nelson Thermodynamic Cycle. Rotational torque is proportionally greater than the 1-to-2 foot-pounds-per-horsepower for short-stroke crankshaft engines in comparison to the 4-to-5 foot-pounds-per-horsepower that results from a 40 percent increase in stroke-length for long-stroke crankshaft engines. Rotational torque is up to 80 foot-pounds-per-horsepower in Nelson engines because it is a multiple of eight times the leverage and ten times the pressure of conventional engines. Nominally, it is 25 foot-pounds-per-horsepower.

In-flight interchangeability between jet and rocket mode of the Nelson Rocketjet Engine with higher thrust in either mode than from state-of-the-art rocket engines obsoletes need for present blast-off practices for space travel. Using this combustion-and-steam engine system and methods, it can provide (a) highly efficient air-breathing thrust for winged flight up to 110-feet altitude that consumes over 95 percent of space-travel propulsion and (b) higher coefficient of thrust for exoatmospheric propulsion. Earth-escape velocity with high-lift-winged vehicles having slow take-off, subsonic atmospheric speed, slow atmospheric reentry, subsonic reentry into sonic-boom altitudes and slow landing are made possible. Costs for space travel can be less than one-ten-thousandth of present costs and less than commercial airline travel. Launching satellites can be as inexpensive as sending airmail packages. Propulsion costs for long-distance flight in-and-out of near-space to avoid sonic boom, in-and-out of the stratosphere or staying in the atmosphere can be 10 percent of present propulsion costs for long-distance flight. Safety can be increased and exhaust can have eco-positive instead of eco-destructive effects.

As stated by the noted Rocket Scientist Wernher Von Braun in the early days of rocketry, blast-off rocket practices would not be necessary if there were an air-breathing jet engine interchangeable in-flight between jet and rocket mode. The Nelson Thermodynamic Cycle makes these and immensely more benefits available to the world now. Economic and political effects can be enormous.

Advantages made possible using various sizes and designs of the Nelson Engine 79 and the Nelson Rocketjet Engine (U.S. Pat. No. 5,222,361) with this invention include:

The power of a train in a Nelson Engine the weight of a car engine;

Zero-to-sixty miles-per-hour acceleration in four seconds with a family car;

Fuel consumption of 150-to-300 miles per gallon in a family car;

One-five-hundredth of the smog of present gasoline engines per power output;

Eco-positive plant-fertilizing instead of eco-destructive exhaust from all rotational and thrust engines;

One percent of engine costs and one-fifth of fuel use for power-plant electrical generation;

Ten-to-twenty times the operating range for helicopters;

Eight-to-fifteen times the operating range for land vehicles and military tanks;

Supersonic jet travel with one-fifth of the fuel consumption above sonic-boom altitudes;

Worldwide non-fueling range for transatmospheric private and commercial aircraft;

Earth-escape-velocity space travel with high-lift-winged slow take-off, slow atmospheric reentry, slow reentry into sonic-boom altitude, subsonic atmospheric speed, slow landing, and increased safety;

Space travel less expensive than present air travel at one-ten-thousandth of present costs per space payload;

Satellite launching for the cost per weight of sending airmail packages; and

Space stations for the cost of surface structures.

A new and useful combustion-and-steam engine system and methods having been described, all such modifications, adaptations, substitutions of equivalents, mathematical possibilities, applications and forms thereof as described by and foreseeable within the following claims are included in this invention.

What is claimed is:

1. A combustion-and-steam engine system comprising:

a phase-change water injector having a steam tube in communication between an injector and an internal periphery of a combustion chamber of a heat engine;

an injector plate on an injector valve having an injector orifice in fluid communication between a valve side and a heat-tube side of the injector plate;

a valve cylinder having a return-valve seat extended inward radially from an inside periphery of a valve-seat end of the valve cylinder;

a valve disk having a seal side, a return side and a design circumferential perimeter;

a fluid-return conveyance intermediate the circumferential perimeter of the valve disk and an inside periphery of the valve cylinder;

a return tube in fluid communication outwardly from a return end of the inside periphery of the valve cylinder;

an orifice cover on a central portion of the seal side of the valve disk;

a disk shoulder on an external surface of the seal side of the valve disk;

a fluid-pressure surface intermediate the orifice cover and the disk shoulder on the seal side of a disk cover;

a fluid chamber having an internal periphery in communication intermediate the valve cylinder and the injector plate;

a fluid-inlet tube in fluid communication intermediate the internal periphery of the fluid chamber and a source of fluid under design pressure;

a return spring in expansion-pressure relationship intermediate a return-spring shoulder and the return side of the valve disk in the valve cylinder; and a means for providing combustion in the combustion chamber.

2. A combustion-and-steam engine system as described in claim 1 and further comprising a phase-change fuel injector having:

a combustion tube in communication between an injector valve and an internal periphery of a combustion chamber of a heat engine;

an injector plate on the injector valve having an injector orifice in fluid communication between a valve side and a heat-tube side of the injector plate;

a valve cylinder having a return-valve seat extended inward radially from an inside periphery of a valve-seat end of the valve cylinder;

a valve disk having a seal side, a return side and a design circumferential perimeter;

a fluid-return conveyance intermediate the circumferential perimeter of the valve disk and an inside periphery of the valve cylinder;

a fuel-return tube in fluid communication outwardly from a return end of the inside periphery of the valve cylinder;

an orifice cover on a central portion of the seal side of the valve disk;

a disk shoulder on an external surface of the seal side of the valve disk;

a fluid-pressure surface intermediate the orifice cover and the disk shoulder on the seal side of a disk cover;

a fluid chamber having an internal periphery in communication intermediate the valve cylinder and the injector plate;

a fuel line in fluid communication intermediate the internal periphery of the fluid chamber and a source of fuel under design pressure; and a return spring in expansion-pressure relationship intermediate a return-spring shoulder and the return side of the valve disk in the valve cylinder.

3. A combustion-and-steam engine system as described in claim 2 wherein:

the heat engine is a Nelson Engine having at least one double-ended power piston that is reciprocative in a double-ended power cylinder and has a Nelson Drive with a plurality of drive rollers in rotational cam-drive relationship between a power shaft attached to the double-ended power piston and a drive shaft.

4. A combustion-and-steam engine system as described in claim 3 wherein:

a steam tube of a first phase-change water injector and a combustion tube of a first phase-change fuel injector are positioned at separate circumferential positions in fluid communication between injector valves of the first phase-change water injector and the first phase-change fuel injector respectively and the combustion chamber of a drive end of a double-ended power cylinder of the Nelson Engine; and a steam tube of a second phase-change water injector and a combustion tube of a second phase-change fuel injector are positioned at separate circumferential positions in fluid communication between injector valves of the second phase-change water injector and the second phase-change fuel injector respectively and the combustion chamber of a compressor end of a double-ended power cylinder of the Nelson Engine.

5. A combustion-and-steam engine system as described in claim 4 wherein:

the first phase-change water injector on the drive end of the double-ended power cylinder is positioned approximately in line with the second phase-change fuel injector on the compressor end of the double-ended power cylinder; and the first phase-change fuel injector on the drive end of the double-ended power cylinder is positioned approximately in line with the second phase-change water injector on the compressor end of the double-ended power cylinder.

6. A combustion-and-steam engine system as described in claim 4 wherein:

opposite ends of the double-ended power cylinder and opposite ends of the double-ended power piston are truncate conical with design angles of conical incline.

7. A combustion-and-steam engine system as described in claim 4 wherein:

axes of the first phase-change water injector, the second phase-change water injector, the first phase-change fuel injector and the second phase-change fuel injector are oriented to design angles in relation to an axis of the double-ended power cylinder.

8. A combustion-and-steam engine system comprising:

a heat engine having a combustion chamber, a power-take-off means, a means for providing fuel and oxidizer in the combustion chamber and means for ignition of the fuel and oxidizer in the combustion chamber;

a phase-change water injector having a steam tube in fluid communication between a water-injector orifice at an injector end of the steam tube and an inlet orifice positioned in a wall of the combustion chamber of the heat engine;

an electrical-resistance heater on the phase-change water injector for transmitting a design phase-change level of heat from the heat engine to walls of the steam tube for phase-change heating water that is injected into the steam tube through the water-injector orifice;

the electrical-resistance heater being powered by current generated from an electrical system of the heat engine;

the internal periphery of the steam tube having a design cross-sectional area and a design length; and the design cross-sectional area of the internal periphery of the steam tube being designedly small in proportion to the design length of the internal periphery of the steam tube in order to position atomized water emerging under pressure from the injector orifice designedly close to the walls of the steam tube and in order to consume design time for travel of water from the injector orifice where the water is atomized en route to the combustion chamber at a combustion-chamber end of the steam tube while the water in the atomized state is being heated for phase-change of the water to designedly gaseous steam in the steam tube, such that phase-change of atomized water to designedly gaseous steam in the steam tube is designedly complete and the gaseous steam reaches the combustion chamber at a design time relative to occurrence of combustion of fuel and oxidizer in the combustion chamber.

9. A combustion-and-steam engine system comprising:

a heat engine having a combustion chamber, a power-take-off means, a means for providing fuel and oxidizer in the combustion chamber and means for ignition of the fuel and oxidizer in the combustion chamber;

a phase-change water injector having a steam tube in fluid communication between a water-injector orifice at an injector end of the steam tube and an inlet orifice in a wall of the combustion chamber of the heat engine;

an electrical-resistance heater positioned internally in the steam tube;

an internal periphery of the steam tube having a cross-sectional configuration that is generally non-restrictive of linear flow of fluid in the steam tube;

the internal periphery of the steam tube having a design length;

the cross-sectional configuration of the internal periphery of the steam tube being designedly small in proportion to design length of the internal periphery of the steam tube for positioning atomized water emerging under pressure from an injector orifice designedly close to internal walls of the steam tube in order to consume design time for travel of phase-changing water from the injector orifice where the water is atomized to the combustion chamber at a combustion-chamber end of the steam tube while the water in a progressively gaseous and atomized state is being heated to combustion-supportive heat levels which also phase-change the water to initially high-pressure gaseous steam in the steam tube;

a heat tube having an electrical-resistance heater positioned internally in the heat tube for providing ignition heat to fuel in fluid communication between a fuel-injector orifice at an injector end of the heat tube and an internal periphery of the combustion chamber of the heat engine;

the heat tube having an internal periphery with a design length and cross-sectional area; and the cross-sectional area of the internal periphery of the heat tube being proportioned to length and an internal heat of the heat tube for providing desired completeness of ignition, combustion and generation of combustion heat in the heat tube prior to achieving desired levels of completeness of combustion and resulting combustion heat in the presence of compressed air in the combustion chamber and in the presence of steam conveyed from the steam tube to the combustion chamber at combustion-supportive heat levels and gaseous fineness which avoid dousing of combustion flame, such that combustion gases in the heat tube provide a designedly fuel-rich pilot combustion that encounters pressurized oxidizer with which it reacts rapidly to generate sufficiently high heat in the combustion chamber to provide peak combustion pressure initially and then to superheat the steam for high pressure that is utilized for power take off throughout remaining major portions of stroke lengths.

10. A combustion-and-steam engine system as described in claim 9 wherein:

the electrical-resistance heater positioned internally in the steam tube and the electrical-resistance heater positioned internally in the heat tube are proximate internal walls of the steam tube and the heat tube respectively.

11. A method comprising the following steps for generating both combustion power and steam power with a heat engine having a combustion chamber and a power-take-off means in power-take-off relationship to the combustion chamber:

providing a means for combustion of fuel and oxidizer in the combustion chamber to generate a design heat of combustion and having a design power-take-off means in power-take-off relationship to the combustion chamber;

providing a phase-change water injector having a steam tube with a design level of heat added to the steam tube from the heat engine with an electrical-resistance heater powered by an electrical system of the heat engine providing a design cross-sectional area of an internal periphery of the steam tube that is designedly small in proportion to a design length of the internal periphery of the steam tube in order to position atomized water emerging under pressure from the injector orifice designedly close to internal walls of the steam tube and in order to consume design time for travel of water from the injector orifice where the water is atomized en route to the combustion chamber at a combustion-chamber end of the steam tube while the water in an atomized state is being heated for phase-change of the water to designedly gaseous steam in the steam tube, such that phase-change of atomized water to gaseous steam in the steam tube is designedly complete and the gaseous steam reaches the combustion chamber at a design time relative to occurrence of combustion of fuel and oxidizer in the combustion chamber;

positioning the phase-change water injector in fluid communication with an inside periphery of a wall of the combustion chamber;

combusting a design quantity of fuel and oxidizer in the combustion chamber to generate combustion heat for expansion pressures of products of combustion and steam in the combustion chamber;

spray-injecting a design quantity of water having a design fineness of atomization into the steam tube from the injector orifice;

phase-changing the design quantity of water spray-injected with the design fineness into the steam tube of the phase-change water injector into designedly gaseous steam within the steam tube with a design level of heat added to the steam tube;

directing the designedly gaseous steam from the steam tube into the combustion chamber through the fluid communication means intermediate the combustion end of the steam tube and the internal periphery of the combustion chamber;

further phase-changing the designedly gaseous steam directed from the steam tube into the combustion chamber into designedly high-pressure steam in the combustion chamber with heat of combustion of the fuel and oxidizer combusted in the combustion chamber;

taking off output work from expansion pressure of products of combustion of the fuel and oxidizer in the combustion chamber with the power-take-off means of the heat engine;

taking off output work from expansion pressure of the designedly high-pressure steam in the combustion chamber with the power-take-off means of the heat engine in addition to taking off output work from expansion pressure of the products of combustion of the fuel and oxidizer; and cooling the heat engine to engine-tolerable levels of heat by absorbing heat from heat of combustion of the fuel and oxidizer in the combustion chamber with phase-change of the designedly gaseous steam into designedly high-pressure steam.

12. A method as described in claim 11 wherein:

heat for ignition of fuel and oxidizer in a heat tube of a phase-change fuel injector is provided by electrical current in communication with an electrical resistor on an inside periphery of the combustion tube; and design rate of conveyance of combustion gases in the heat tube is provided by an internal periphery of the combustion tube having a sufficiently large diameter and short length for the design rapidity of conveyance.

* * * * *

UNITED STATES PATENT AND TRADEMARK OFFICE
CERTIFICATE OF CORRECTION

PATENT NO. : 5,803,022
DATED : September 8, 1998
INVENTOR(S) : Daniel Emmet Nelson, et al.

It is certified that error appears in the above-identified patent and that said Letters Patent is hereby corrected as shown below:

On the title page item [76], should read--5897 Lakeville Road Orlando, Florida 32818--

Signed and Sealed this

Twenty-sixth Day of January, 1999

Attest:

Attesting Officer

*Acting Commissioner of Patents and Trademarks*